United States Patent [19]

Wildhaber

[11] 4,107,950

[45] Aug. 22, 1978

[54] FLEXIBLE-DISK COUPLING

[76] Inventor: Ernest Wildhaber, 124 Summit Dr., Rochester, N.Y. 14620

[21] Appl. No.: 801,009

[22] Filed: May 26, 1977

[51] Int. Cl.² .......................... F16D 3/78; F16D 3/52
[52] U.S. Cl. ...................... 64/13; 64/15 R; 64/15 B
[58] Field of Search ....................... 64/13, 15 R, 15 B

[56] References Cited

U.S. PATENT DOCUMENTS

| | | | |
|---|---|---|---|
| 3,041,857 | 7/1962 | Anderson et al. | 64/13 |
| 3,808,837 | 5/1974 | Anderson et al. | 64/13 |
| 3,988,907 | 11/1976 | Bohn et al. | 64/13 |
| 4,044,571 | 8/1977 | Wildhaber | 64/13 |

Primary Examiner—Benjamin W. Wyche
Assistant Examiner—R. C. Turner

[57] ABSTRACT

The disks of this coupling are very moderately tapered, so that straight lines extending in the general direction of and along opposite disk profiles intersect at a distance from the disk axis at least three times the mean radius of the disks. While concavely curved disk profiles may be used, their curvature is small enough that straight profiles offer a good approximation. The competitive disk characteristics are analyzed in the specification.

8 Claims, 7 Drawing Figures

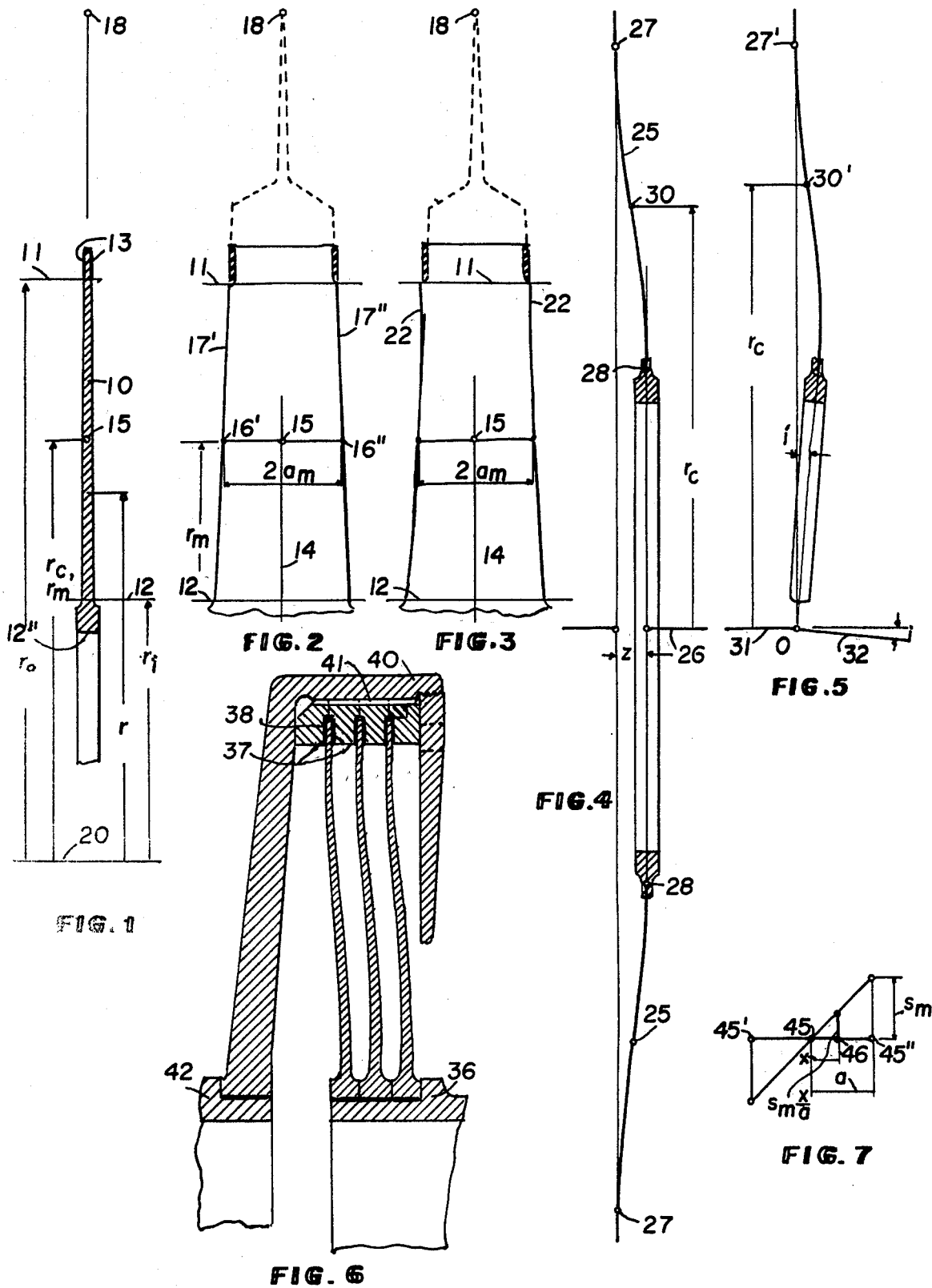

FLEXIBLE-DISK COUPLING

The invention will be described in connection with the drawings, where

FIG. 1 is a fragmentary axial disk section.

FIG. 2 is a similar section, where however the horizontal scale is hugely exaggerated to bring out the disk characteristics. It shows a disk with conical side surfaces, having straight profiles.

FIG. 3 is similar to FIG. 2, but shows exaggerated concave disk profiles.

FIG. 4 shows the center line of a disk in axial section, in a position where the two coupling members are coaxial but shifted axially one with respect to the other.

FIG. 5 is a fragmentary view of a disk center line where the two disk axes intersect at O and include an exaggerated angle $i$.

FIG. 6 is a fragmentary axial section of a coupling with multiple disks, where the shown two coupling members are coaxially shifted with respect to one another, as in FIG. 4.

FIG. 7 is an explanatory stress diagram.

FIG. 1 shows a disk 10 of small taper, where the thickness of the working portion, between lines 11 and 12 is at least two thirds at 11 as it is at 12. Disk 10 may be welded at 12" to one coupling member, and may be bonded to portions rigid with the mating coupling member through rubber-like sheets 13. This connection permits slightly different expansion between the disk and said mating coupling member to avoid stress peaks. The sheets may be bonded to the disk or to said portions, or to both.

In FIG. 2 numeral 14 denotes the mid-plane of the undeflected disk 10. Its point 15, with radius $r_m$, is midway between the outer and inner ends 11, 12 of the working portion of the disk. 16'—16" is the disk thickness there. FIG. 2 shows straight disk profiles 17', 17". They converge to a point 18 at a distance 3 $r_m$ from mean point 15, and at a distance four times this radius from axis 20.

The range claimed for the invention is for opposite profiles directed to intersect in extension at a distance from the disk axis of at least 3 $r_m$ and up to 6 $r_m$.

FIG. 3 differs from FIG. 2 by showing concavely curved disk profiles 22 with much exaggeration. The profiles actually have a curvature more than 10 times smaller than the profiles of a widely used design, in which the thickness is $$2a = 2 a_m (r_m/r)^2 \tag{B}$$

In the here described specific example the disk thickness is $$2a = 2 a_m \sqrt[3]{r_m/r}.$$

Its profile is practically straight, and can be so used in good approximation.

FIG. 4 shows a disk center line 25 after the coupling members have been relatively displaced along their common axis 26.

The flexing portion of the disk extends between the outer points 27 and the inner points 28. 30 is the point of inflection. As will be shown, it is here exactly midway between the end points 27, 28 of the working portion. 26 shows the coinciding coupling axes.

FIG. 5 shows the disk center-line when the coupling axes 31, 32 intersect at O, which lies in a plane through points 27' perpendicular to axis 31. 30' is the point of inflection of the center line.

The couplings may be made with a single disk or with multiple disks, FIG. 6. The two coupling members shown are coaxial, and one is displaced axially with respect to the other. The disks have the flexed centerlines shown in FIG. 4. They are secured at their inside to a coupling member 36, as by welding. At their outside they may be secured to ring-shaped parts 37 through rubber-like sheets 38. Such connections are shown with more detail in my patent application entitled "Flexing-Disk Coupling", filed June 11, 1976, Ser. No. 695,205. Parts 37 are rigidly but removably connected with the mating coupling member 40, as for instance with splines 41. The cup-shaped body of member 40 is connected with its shaft 42, for instance by welding.

FIG. 7 shows up the stresses incurred in the transmission of a bending moment. A simple force is transmitted in the disk at the point of inflection, 30 in FIG. 4, 30' in FIG. 5. At points with other radii however a bending moment is added. It increases with increasing distance of a considered point from the point of inflection. The axial section FIG. 7 shows the linear distribution of the stress. The maximum stress $s_m$ is at the outside end points 45', 45", while the stress is zero at center 45. Points 45', 45" are half the disk-thickness $2a$ away from central point 45. At any intermediate point 46, with distance $x$ from point 45, the stress amounts to $s_m \cdot (x/a)$, so that the force transmitted per infinitesimal width $dx$ amounts to $s_m \cdot (x \, dx/a)$. The total transmitted moment per unit width is $$\frac{2 s_m}{a} \cdot \int_0^a x^2 dx = \frac{2}{3} s_m \cdot a^2.$$

Per width $r \cdot \text{arc } d\alpha$ it is $\frac{2}{3} s_m \cdot a^2 \cdot r \text{ arc } d\alpha = p \cdot \text{arc } d\alpha (r_c - r)$. Herein $p$ denotes the pressure exerted at the instant center (30 or 30') with radius $r_c$ per angle of arc 1, if continued. Hence $$s_m = \frac{1\frac{1}{2} p}{a^2} \cdot \frac{(r_c - r)}{r} \tag{a}$$

The disk stresses are composites of three basic cases:
(1) The axes of the two coupling members intersect at a point contained in the mid-plane of the disk.
(2) A purely axial relative displacement of the aligned coupling members.
(3) Centrifugal stresses through high-speed rotation.

The stresses in case (1) change during each revolution and reverse in each half-turn. The stresses in cases (2) and (3) change very slowly and can be larger without ill effect.

Returning to FIG. 7, the disk profile stretches by $(s_m/E) \, dr$ per radial increment $dr$, at point 45'. E denotes the modulus of elasticity. At 45" the disk profile is compressed. Central point 45 shows no stretching or compression. Accordingly sections apart by $dr$ include an angle $s_m \cdot dr/E \cdot a$. Introducing $s_m$ from (a), the angular change $dt$ per radial change $dr$ is $$\frac{dt}{dr} = \frac{12p}{E \cdot (2a)^3} \cdot \frac{r_c - r}{r} \tag{b}$$

The inclination $t$ of the disk center-line to the radial direction is found by integration, with the addition of a constant so determined that $t$ is zero for $r = r_o$ at the outer member, and for $r = r_i$ in the coordinate system based on the mating member.

Let us look first at case (2), where the aligned coupling members are shifted axially with respect to one another. Here we have the relationship $$(2a)^3 \cdot r = (2a_m)^3 \cdot r_m$$

Equation (b) then becomes $$dt/dr = 12 \, Q' \cdot r_m^2 \cdot (r_c - r);$$

where $$Q' = \frac{P}{2\pi E \cdot (2 \, a_m r_m)^3}$$

$P$ is the total axial force applied to one coupling member, $2 a_m$ is the disk thickness at mean radius $r_m = \frac{1}{2}(r_o + r_i)$, where $r_o$ and $r_i$ are the outside radius and the inside radius respectively of the flexing working portion of the disk. $r_c$ is the radius to the point of inflection 30 or 30'. Hence $$t = 12 \, Q' \cdot r_m^2 \, (r_c \cdot r - \frac{1}{2} r^2) + \text{a constant}$$

The said constant is $-(r_c \cdot r_i - \frac{1}{2} r_i^2)$ for the inner disk portion, inside the point of inflection. It is $-(r_c \cdot r_o - \frac{1}{2} r_o^2)$ for the outer disk portion.

The inclination $t$ to the radial direction is for $r = r_c$ $$t_i = 12 \, Q' \, r_m^2 \, (\frac{1}{2} r_c^2 - r_c \cdot r_i + \frac{1}{2} r_i^2)$$

for the inner portion, $$t_o = 12 \, Q' \, r_m^2 \, (\frac{1}{2} r_c^2 - r_c \cdot r_o + \frac{1}{2} r_o^2)$$

for the outer portion.

At $r_c$ the said two portions join smoothly, $t_i = t_o$. Hence $$r_c(r_o - r_i) = \frac{1}{2}(r_o^2 - r_i^2) \text{ and}$$

$$r_c = \frac{1}{2}(r_o + r_i)$$

The point of inflection, with radius $r_c$, is here exactly midway between the outer and inner ends of the flexing surface of the disk.

The axial shift $z = (z_i + z_o)$ can be demonstrated to amount to $2 z_i = 2 z_o$.

$$z_i = \int_{r_i}^{r_c} t \, dr$$

$$z_i = 12 \, Q' \cdot r_m^2 [(r_c^3/3) - \frac{1}{2} r_c \cdot r_i^2 + (r_i^3/6) - r_c(r_c \cdot r_i - \frac{1}{2} r_i^2) + r_i(r_c \cdot r_i - \frac{1}{2} r_i^2)]$$

$$2 z_i = 8 \, Q' \, r_m^2(r_c^3 - 3 r_c^2 \cdot r_i + 3 r_c \cdot r_i^2 - r_i^3)$$

$$z = 2 z_i = Q' \cdot r_m^2 \, (r_o - r_i)^3$$

From (a), and substituting $P/2\pi$ for $p$ $$s_m = \frac{1\frac{1}{2} P}{2\pi a^2} \cdot \frac{(r_c - r)}{r},$$

inner portion with $$a^3 \cdot r = a_m^3 \cdot r_m;$$

$$a^2 \cdot r = a_m^2 \cdot r_m \cdot (r/r_m)^{0.3333}$$

$$s_m = \frac{6 P}{2\pi (2 \, a_m)^2 r_m \cdot (\frac{r}{r_m})^{.3333}} \cdot (r_o - r)$$

$$s_{mi} = G' \cdot \frac{r_m}{r_o} \cdot (\frac{r_m}{r_i})^{.3333} \frac{(r_c - r_i)}{r_o};$$

$$G' = \frac{6 P r_o^2}{2\pi (2 \, a_m \cdot r_m)^2}$$

$$s_{mo} = G' \cdot (\frac{r_m}{r_o})^{1.3333} \cdot \frac{(r_o - r_c)}{r_o}; \text{ For } \frac{r_i}{r_o} = 0.45 \text{ below:}$$

$$s_{mi} = G' \cdot 0.2337 \text{ at } z = Q' \cdot r_o^5 \cdot \frac{r_m^2 (r_o - r_i)^3}{r_o^5}$$

$$s_{mo} = G' \cdot 0.1791 \quad = Q' \cdot r_o^5 \cdot 0.08745$$

In the named widely used design, where $2 a = 2 a_m(r_m/r)^2$, $s_{mo} = G' \cdot 0.2643$ at $z = Q' \cdot r_o^5 \cdot 0.07043$.

At the separation of $z$ as above, the stress $s_{mo}$ is increased to $0.08745/0.07043 \cdot G' \cdot 0.2643 = G' \cdot 0.328 = 140\%$ of $s_{mi}$.

In the proposed design the stress is considerably smaller, increasing its capacity.

Case (1), where the axes of the two members of a coupling intersect at O and include a small angle $i$ with each other:

Here we use most of the discussed formulas, substituting however $Q$ for $Q'$.

$$Q = P/E \cdot (2 \, a_m \cdot r_m)^3;$$

where $p$ is the pressure in a plane perpendicular to the tilt axis, per unit angle.

$$\frac{dt}{dr} = \frac{12 \, p}{E \cdot (2 \, a_m)^3 \cdot r_m} (r_c - r) = 12 \, Q \, r_m^2 \cdot (r_c - r)$$

The equations for $t$, $t_i$, $t_o$ and $s_m$ are the same as before, except for the substitution of $Q$ for $Q'$.

Here however $t_i$ and $t_o$ differ. $t_i - t_o = i$.

Substituting $Q$ for $Q'$ we have also the same formulas as for case (2) for $z_i$, $z_o$, $z = (z_o + z_i)$. Here however $z = r_c \cdot \text{arc } i, = r_c \cdot (t_i - t_o)$ $$z = 4 \, Q \, r_m^2 \, [3 \, r_c^2(r_o - r_i) - 1\frac{1}{2}(r_o^2 - r_i^2) \cdot r_c]$$

Also $$z = 4 \, Q \, r_m^2 \, [(r_o^3 - r_i^3) - 3 \, r_c(r_o^2 - r_i^2) + 3 \, r_c^2(r_o - r_i)]$$

Hence $$1\frac{1}{2} \, r_c(r_o^2 - r_i^2) = (r_o^3 - r_i^3)$$

$$r_c = \frac{2}{3} \cdot \frac{(r_o^3 - r_i^3)}{(r_o^2 - r_i^2)}; \frac{r_c}{r_o} = \frac{2}{3} \cdot \frac{1 - (\frac{r_i}{r_o})^3}{1 - (\frac{r_i}{r_o})^2}$$

All numerical figures shown hereafter are for $$r_i/r_o = 0.45$$

$r_c/r_o = 0.7598$ $\text{arc } i = 4 Q r_m^2 [3 r_c(r_o - r_i) - 1\frac{1}{2}(r_o^2 - r_i^2)]$ $= 4 Q (\frac{r_m}{r_o})^2 (1 - \frac{r_i}{r_o}) \left[ 3(\frac{r_c}{r_o}) - 1\frac{1}{2}(1 + \frac{r_i}{r_o}) \right] \cdot r_o^4 = Q r_o^4 \cdot 0.1206$ $G = \frac{6 p r_o^2}{(2 a_m \cdot r_m)^2}$ $s_{mo} = G \cdot 0.1565$
$s_{mi} = G \cdot 0.2633$ at $i = Q \cdot r_o^4 \cdot 0.1206$ In (B), the establishd design $s_{mo} = G \cdot 0.2344$ at $i = Q \cdot r_o^4 \cdot 0.08179$.

At the above $i = Q \cdot r_o^4 \cdot 0.1206$, $s_{mo} = G \cdot 0.3456$ for (B). This is amply larger than $s_{mi}$ above.

After having established the merits of the proposed design, what I claim is:

1. A flexible-disk coupling containing at least one disk decreasing in thickness towards the outside and connected at the outside to a rotary part and at the inside to a mating rotary part of the coupling, whereby in axial sections the straight lines that pass through the mean points of opposite disk profiles in the directions of said profiles, intersect at distances from the disk axis between 2¼ and six times the radial distance of said points from the disk axis, thereby including an uncommon small angle with each other, said mean points being midway between the outer and inner ends of the disk-working surface.

2. A flexible-disk coupling according to claim 1, wherein in the unstressed state the sides of the working portion of a disk are conical surfaces with straight profiles in axial sections.

3. A flexible-disk coupling according to claim 1, wherein the disk sides have concavely curved profiles in axial sections, the curvature radius of said profiles being larger than 30 times the outside radius of the disk.

4. A flexible-disk coupling according to claim 1, containing a disk whose outer end portion has a radially expandable connection with one of said two rotary parts.

5. A flexible-disk coupling according to claim 4, wherein the outer periphery of said disk is connected to a part rigid with one of said two rotary parts through rubber-like sheet means.

6. A flexible-disk coupling according to claim 4, containing a plurality of adjacent disks, said disks being connected at their outside through rubber-like sheets to one of two mating coupling members.

7. A flexible-disk coupling according to claim 6, wherein said rubber-like sheets are bonded respectively to said disks.

8. A flexible-disk coupling according to claim 6, wherein said rubber-like sheets are bonded respectively to ring-shaped parts rigid with said one coupling member.

* * * * *